United States Patent
Pruett (10) Patent No.: US 11,172,550 B2
(45) Date of Patent: Nov. 9, 2021

(54) DUAL-CONTROL LED DIMMING SYSTEM AND METHOD

(71) Applicant: SEMICONDUCTOR COMPONENTS INDUSTRIES, LLC, Phoenix, AZ (US)

(72) Inventor: Henry Frazier Pruett, North Bend, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 13 days.

(21) Appl. No.: 16/588,516

(22) Filed: Sep. 30, 2019

(65) Prior Publication Data

US 2020/0314975 A1    Oct. 1, 2020

Related U.S. Application Data

(60) Provisional application No. 62/825,165, filed on Mar. 28, 2019.

(51) Int. Cl.
| | |
|---|---|
| *H05B 45/10* | (2020.01) |
| *H05B 45/14* | (2020.01) |
| *H05B 45/37* | (2020.01) |
| *H05B 39/04* | (2006.01) |
| *H05B 45/3725* | (2020.01) |

(52) U.S. Cl.
CPC .......... *H05B 45/10* (2020.01); *H05B 39/041* (2013.01); *H05B 45/14* (2020.01); *H05B 45/3725* (2020.01)

(58) Field of Classification Search
None
See application file for complete search history.

(56) References Cited

U.S. PATENT DOCUMENTS

| | | | |
|---|---|---|---|
| 9,844,111 B1 | 12/2017 | Chen et al. | |
| 2009/0134817 A1* | 5/2009 | Jurngwirth | ............. H05B 45/46 315/307 |
| 2016/0212813 A1 | 7/2016 | Li | |

\* cited by examiner

*Primary Examiner* — Dedei K Hammond
(74) *Attorney, Agent, or Firm* — Brake Hughes Bellermann LLP (57) ABSTRACT

A dual-control dimming system is disclosed. The dual-control dimming system is configured to automatically change control of an LED between two control loops as an LED output is adjusted over a dimmable range. A first control loop may take control of the LED output in a first portion of the dimmable range, while the second loop may take control of the LED output in a second portion of the dimmable range. In this way, the LED may be powered efficiently in the first portion, while providing stable (i.e., flicker-free) output in the second portion.

19 Claims, 5 Drawing Sheets

DUAL-CONTROL LED DIMMING SYSTEM AND METHOD

CROSS REFERENCE TO RELATED APPLICATION

This application claims the benefit of U.S. Provisional Application No. 62/825,165, filed Mar. 28, 2019, and entitled "Deep Dimming for LED Drivers," which is hereby incorporated by reference in its entirety.

FIELD OF THE DISCLOSURE

The present disclosure relates to light-emitting diode (LED) lighting and, more specifically, to a circuit and method for dimming an LED without visual artifacts.

BACKGROUND

LED drivers may use a dimming interface (i.e., dimming circuit) to reduce the intensity of (i.e., dim) an LED. For example, a dimming circuit can dim an LED to a reduced output that is some percentage (e.g., 10%) of a maximum output (e.g., 100%). As the output of the LED is reduced, it presents less of a load to a power supply. At the reduced output of 10%, the LED may be considered a light load, while at the maximum output of 100% the LED may be considered a heavy load. A switched-mode power supply (SMPS) can efficiently supply regulated power to a heavy load. As the load is reduced by dimming, however, the SMPS may be operate in a burst mode (i.e., skip mode) to maintain regulation. While the burst mode may expand the LED's range of outputs by reducing its minimum output (e.g., to around 1%), it may cause visual artifacts (e.g., flicker) in the output of the LED that are objectionable in some lighting applications.

SUMMARY

In at least one aspect, the present disclosure generally describes a dual-control dimming circuit. The dual-control dimming circuit includes a current sensor that is configured to sense an LED current conducted by an LED, which corresponds to an LED output. The dual-control dimming circuit further includes a main loop that is configured to control the LED current conducted by the LED by adjusting an output of a switched mode power supply (SMPS) when the LED output is above a threshold. The dual control dimming circuit further includes a linear loop that is configured to control the LED current conducted by the LED by adjusting an operating point of a linear pass element (LPE) when the LED output is below a threshold.

In another aspect, the present disclosure generally describes a method for controlling an LED output. The method includes receiving a dim control input at a dual-control dimming system that is configured to control the LED output using a main loop or a linear loop. The main loop is used to control the LED output according to the dim control input when the LED output satisfies a condition and the linear loop is used to control the LED output according to the dim control input when the LED output in response to the condition being unsatisfied. Using the linear loop to control the LED can prevent a SMPS of the main loop from creating a visual artifact (e.g., a flicker) in the LED output.

In another aspect, the present disclosure generally describes a dual-control dimming circuit that includes a current sensor configured to generate a sensed current signal that corresponds to an LED current. The dual-control dimming circuit further includes a main-loop control circuit that is configured to generate a control signal for a switched-mode power supply based on a comparison between the sensed current signal and a main reference signal. The dual-control dimming circuit further includes a linear-loop control circuit that is configured to generate a control signal for a linear pass element based on a comparison between the sensed current signal and a linear reference signal. The dual-control dimming circuit further includes a dim control circuit that is configured to generate the main reference signal and the linear reference signal based on a received dim control signal. In a possible implementation the dim control circuit includes a resistor network. The resistor network is configured to provide an offset between the main reference signal and the linear reference signal.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

The present disclosure describes a system, circuit, and method for dimming an LED output. In particular, a dual-control dimming system is disclosed. The dual-control dimming system is configured to automatically switch control of the LED between dual (i.e., two) control loops (i.e., loops) as the LED is dimmed. A first control loop may efficiently generate an LED current when the LED output is in a first portion of a dimmable range but may generate a ripple on the LED current in a second portion of a dimmable range (i.e., a deep dimming portion). The ripple on the LED current may result in a flicker (i.e., amplitude modulation) in the LED output that is undesirable. A second control loop does not generate a ripple on the LED output. Accordingly, the first control loop may take control of the LED output in the first portion, while the second loop may take control of the LED output in the second portion. In this way, the LED may be powered efficiently, and the dimmable range may be extended to deep dimming levels without flicker in the LED output.

The dual-control dimming system does not, in some implementations, require pulse width modulation (PWM)

and/or pulse frequency modulation (PFM) to deeply dim the LED (e.g., to less than 10%) without flicker. Further, the disclosed dual-control dimming system does not enable/disable or physically switch between loops according to some monitored condition. Instead, the control is exchanged based on the operating characteristics of each control loop over the dimmable range (e.g., a range of 1% to 100%).

As the LED is dimmed, the control of the dual-control dimming system can be determined by a threshold corresponding to a cross-over point defined by input/output operating curves (i.e., transfer functions) of the dual control loops. In other words, the threshold (and/or condition) defines a first portion and a second portion of the dimmable range. In the first portion (e.g., above the threshold, satisfying the condition), the first control loop controls the LED output by controlling an output of switched-mode power supply (SMPS) that supplies the LED with current. In the second portion (e.g., below the threshold, not satisfying the condition), the second control loop controls the LED output by controlling an impedance of a linear pass element in series with the LED that passes the LED current. Which control loop controls the LED output is determined by the loop that controls the LED current to a lower level (i.e., determined by which control loop is a limiting control loop). The control loops are designed so that the limiting control loop changes at the cross-over point (i.e., at the threshold, at the condition).

Figure 1:
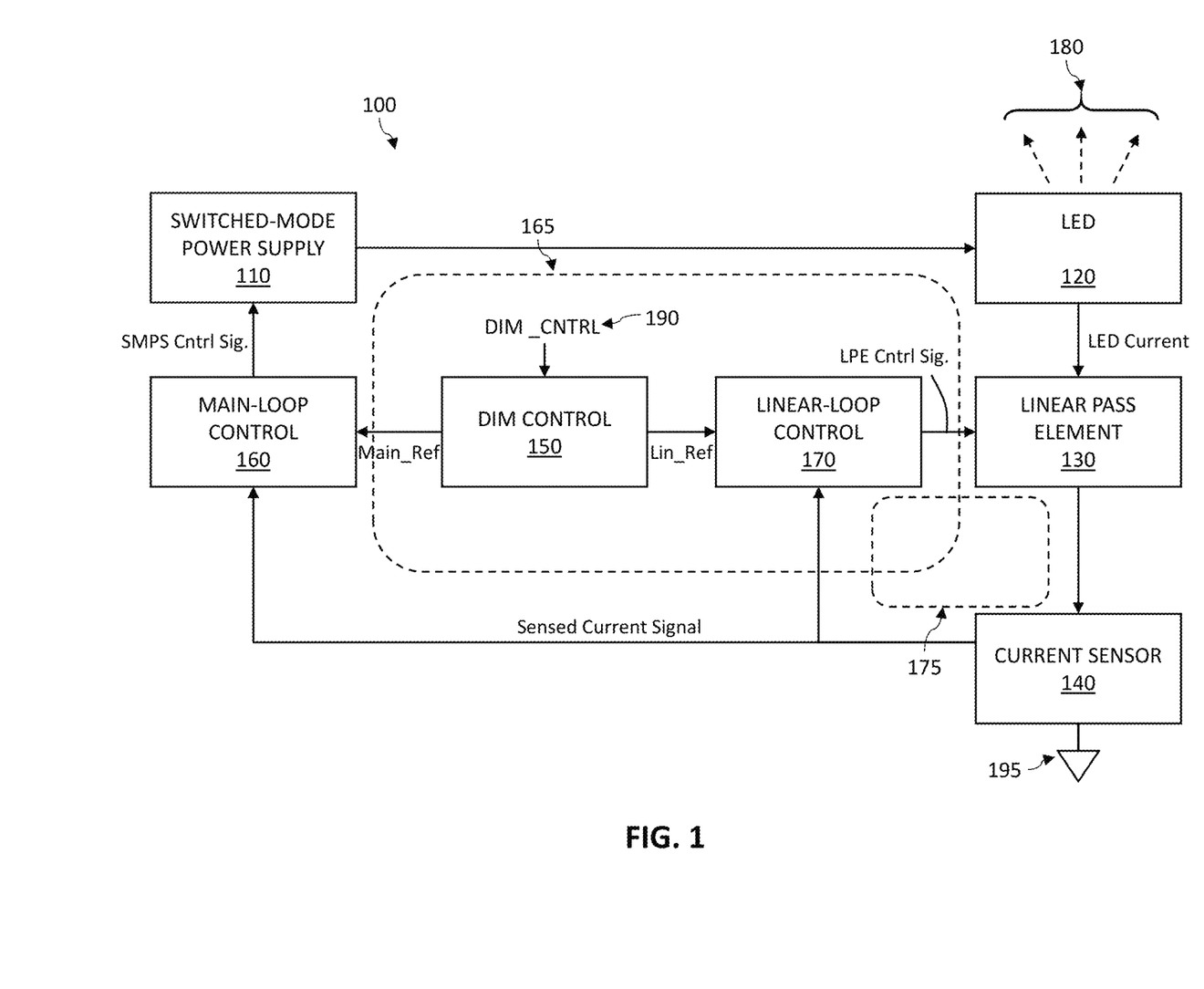
FIG. 1 depicts a system block diagram of dual-control dimming system according to a possible implementation of the present disclosure.

FIG. 1 depicts a system block diagram of dual-control dimming system according to a possible implementation of the present disclosure. The dual-control dimming system 100 is configured to adjust/control an LED output 180 (e.g., luminous intensity) based on a dim control input 190 (i.e., DIM_CNTRL). In some implementations, a user may determine a dim control input (i.e., dim control) via a controller (e.g., a slider switch, a remote control, etc.)

The dual-control dimming sysetm 100 includes a first control loop (i.e., a main loop 165) to control the LED output 180 in a first portion of a dimmable range. For example, the main loop 165 controls the LED output 180 when the dim control input 190 corresponds to a maximum (i.e., 100%) LED output. The main loop 165 includes a main-loop control circuit (i.e., main-loop control) 160 that is configured to receive a main-reference level (i.e., main reference signal, main_Ref) from a dim control circuit (i.e., dim control) 150 and a sensed signal corresponding to an LED current (i.e., Sensed Current Signal) from a current sensor 140 in series with the LED 120.

The main loop 165 is configured to compare (e.g., determine a difference between) the main-reference level and the sensed current level to generate an SMPS control signal (i.e., SMPS Cntrl Sig.). The SMPS control signal is transmitted from the main-loop control 160 to a switch-mode power supply (i.e., SMPS) 110. The SMPS is configured by the SMPS control signal to generate an LED current for powering the LED 120 and causing the LED to emit the LED output 180 (e.g., visible light).

The dual-control dimming system 100 further includes a second control loop (i.e., a linear loop 175) configured to control the LED output 180 in a second portion of a dimmable range. For example, the linear loop 175 controls the LED output 180 when the dim control input 190 corresponds is less than a threshold corresponding to a particular LED output (e.g., approximately 10%). The linear loop 175 includes a linear-loop control circuit (i.e., linear-loop control) 170 that is configured to produce a linear pass element (LPE) control signal (i.e., LPE Cnrl Sig.) based on a linear-reference level (i.e., linear reference signal, linear reference, Lin_Ref) from the dim control 150 and the sensed current signal from the current sensor 140. The LPE control signal is transmitted from the linear-loop control 170 to a linear pass element 130, which can be implemented as a transistor (e.g., metal oxide semiconductor field effect transistor (MOSFET), junction field effect transistor (JFET), bipolar junction transistor (BJT), insulated-gate bipolar transistor (IGBT), etc.). The linear pass element 130 is configured by the LPE control signal to pass/resist an LED current flowing through the LED 120. The LED current flows from through the LED 120, the linear pass element 130, and the current sensor 140 to a ground 195.

The dual-control dimming system 100 can extend a dimmable range over which the LED output can be dimmed (i.e., can enable deep dimming). For example, the dual-control dimming system 100 can dim the LED output 180 from a maximum (or high) LED output level (e.g., approximately 100%) to a minimum (or low) LED output level (e.g., less than approximately 1%) without artifacts (e.g., flicker) in the LED output 180. The flicker-free operation is due at least in part to the second loop taking control of the dimming. For example, use of the second control loop can eliminate the SMPS for control in conditions where it would otherwise cause a ripple in the LED output.

As mentioned, the LED output can be reduced by reducing the regulated output (e.g., voltage, current) of the SMPS. Reducing the regulated output of the SMPS can cause the regulated output (e.g., voltage) to have an AC component (i.e., a ripple). The AC component can result from the SMPS operating in a burst mode (i.e. skip mode). The skip mode operation can be explained as follows. A SMPS has a regulated output that corresponds to a duty cycle of switching. As the SMPS output is reduced (i.e., as the load on the SMPS is reduced), the duty cycle of the SMPS can drop to a level that is difficult to maintain efficiently. As a result, the SMPS may enter into a skip mode in which the switching is paused and restarted (i.e., cycles are skipped) to improve operation (e.g., increase efficiency). This pausing and/or restarting (i.e., skipping) can create the AC component on the regulated output of the SMPS, which can generate an oscillating variation (i.e., ripple) on the LED output 180. In some cases, the ripple may correspond to a ±1% variation in the LED output, which can be undesirable (e.g., to a user).

The disclosed dual-control dimming system 100 can extend the flicker-free dimming by providing a different control as the load on the SMPS is reduced (i.e., as the LED current is reduced). Accordingly, a range of LED output may be divided into a first portion (e.g., from approximately 8% to 100%) and a second portion (e.g., from less than 1% to approximately 8%). In the first portion, the main loop controls LED output while the linear loop has little (e.g., no) control, while in the second portion, the linear loop controls the LED output while the main loop little (e.g. no) control. In other words, in the first portion, the LED output can be controlled by controlling the SMPS 110 while maintaining a fixed operation of the linear pass element 130. In the second portion, the LED output can be controlled by controlling the linear pass element 130 while maintaining a fixed operation of the SMPS 110.

In the first portion of the dimmable range (e.g., approximately 8% to approximately 100%) the linear pass element (e.g., transistor) 130 may be configured by the linear-loop control 170 to conduct substantially all of the LED current. For example, in the first portion, the linear-loop control 170 may apply a voltage (i.e., a pass-element control signal) to a gate (i.e., a base) terminal of a transistor to place the transistor in a fully ON-condition (i.e., saturated condition).

As a result, in the first portion, the linear pass element 130 can be operational while not affecting the control of the LED current.

As the DIM_INPUT is adjusted (e.g., decreased) and the LED output enters a second portion of the dim levels (e.g., less than approximately 8%). In the second portion, the SMPS control signal controlling the SMPS is limited or saturated at a fixed value. The limiting or saturating may prevent the SMPS from entering into a burst mode of operation. In other words, the control signal reducing the output of the SMPS may be limited to a lowest output level that is above an output level at which the effects of a burst mode are significant. At the same time, the linear pass element (e.g., transistor) may be configured by the linear-loop control to conduct less of (i.e., reduce) the LED current. For example, in the second portion, the linear-loop control may apply a voltage to the gate (i.e., the base) terminal of the transistor to place the transistor in a partially ON-condition (i.e., linear condition). Accordingly, in the second portion, the linear pass element can control the LED current.

The control loops may be similar in their operation. The main-loop control 160 receives a main reference signal (i.e., Main_Ref) from the dim control 150 and a sensed current signal from the current sensor 140. Likewise, the linear-loop control 170 receives a linear reference signal (i.e., Lin_Ref) from the dim control 150 and sensed current signal from the current sensor. The inputs to the main-loop control 160 may be different from the inputs to the linear-loop control. These differences may be observed in a transfer function (i.e., output versus input) for each control loop.

The main loop 165 and the linear loop 175 may be configured to both operate over the range of dimmable levels, but the control of the LED output may be passed between the two loops (i.e., exchanged) at some point (e.g., at a threshold) within the range of dimmable levels. The operation of the main loop can be defined by a first transfer curve (i.e., main-loop transfer curve), and the operation of the linear loop can be defined by a second transfer curve (i.e., linear-loop transfer curve). The main-loop transfer curve and the linear-loop transfer curve may be configured to define a cross-over point when plotted together. The cross-over point can correspond to the hand-off of control (i.e., the threshold). Accordingly, by adjusting the cross-over point, the dual-control dimming system can be adapted to accommodate different skip mode operating characteristics. What is more, the dual-control dimming system is agnostic to the SMPS topology (i.e., type) used. A set of possible types of SMPS suitable for use in the dual-control dimming system can include (but are not limited to) an LLC converter, a fly-back converter, a full-bridge converter, a half-bridge converter.

Figure 2:
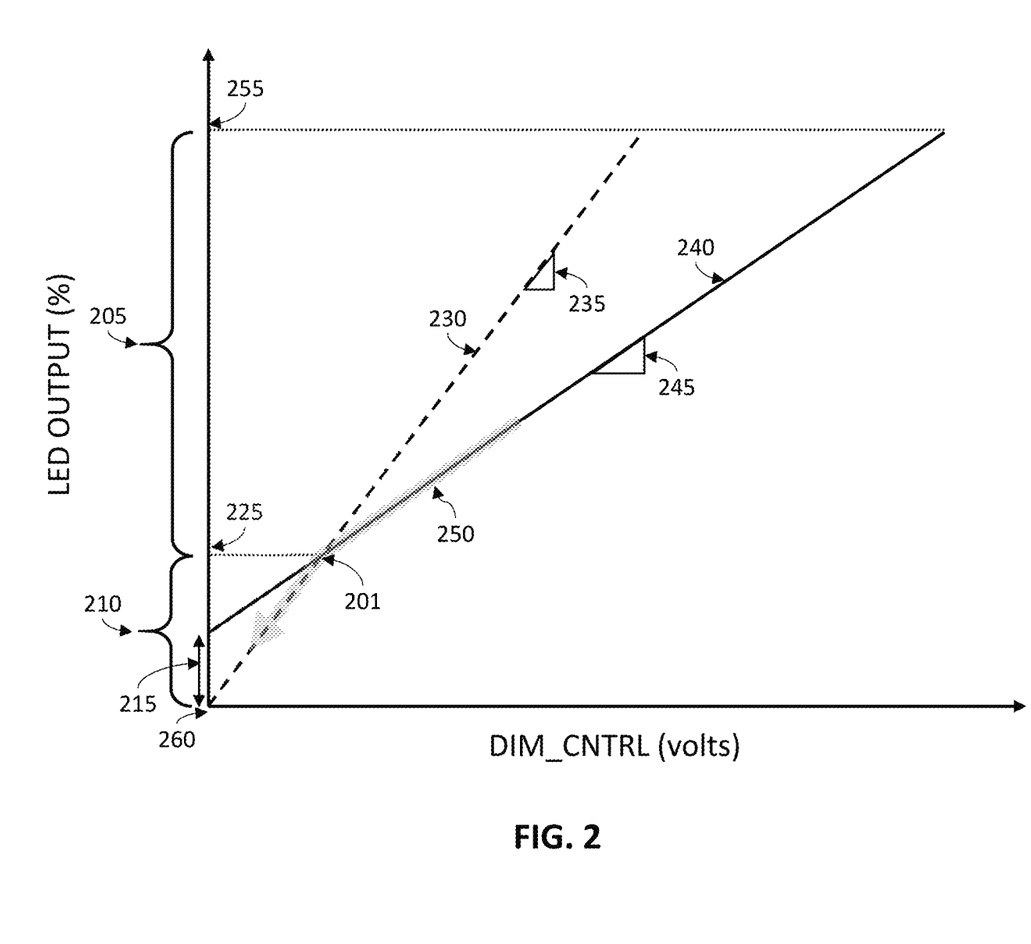
FIG. 2 is a graph depicting transfer functions for a main loop and a linear loop in a dual-control dimming system according to a possible implementation of the present disclosure.

FIG. 2 is a graph depicting transfer functions for the main loop 165 and a linear loop 175 in a dual-control dimming system, according to a possible implementation of the present disclosure. The transfer functions are a plot of the LED output versus a dim control input. While the main-loop control 160 and the linear-loop control 170 may be implemented similarly (e.g., the same), differences between the transfer functions exists because for a given dim control input (i.e., DIM_CNTRL), the main-loop control 160 may receive a first reference signal (i.e., Main_Ref), while the linear-loop control 170 may receive a second reference signal (i.e. Lin_Ref). The differences may be the result of circuitry (e.g., a resistor network) included in the dim control 150. The differences between Main_Ref and Lin_Ref may include an offset voltage.

Additionally, in a possible implementation, the main-loop control 160 may receive a first signal (i.e. a first sensed current signal) from the current sensor 140 that represents the LED current, while the linear-loop control 170 may receive a second signal (i.e. a second sensed current signal) from the current sensor 140 that also represents the LED current but at a different level (i.e., voltage). In some implementations (e.g., FIG. 1), however, the first signal and the second signal are identical.

The main-loop control 160 is configured to compare the reference signal (i.e., Main_Ref) to the sensed current signal (i.e. the first signal) to produce the SMPS control signal. Accordingly, by adjusting the dim control input (DIM_CNTRL) the LED output may be controlled by the main-loop control 160 along a main-loop transfer function 240 (i.e. solid line) between a minimum level 260 (e.g., less than approximately 1%) and a maximum level 255 (e.g., approximately 100%). Likewise, the linear-loop control 170 is configured to compare the reference signal (i.e., Lin_Ref) to the sensed current signal (i.e., the second signal) to produce the LPE control signal. Accordingly, by adjusting the dim control input (DIM_CNTRL) the LED output may be controlled by the linear-loop control 170 along a linear-loop transfer function 230 (i.e. dotted line) between a minimum level 260 (e.g., approx. 1%) and a maximum level 255 (e.g., approx. 100%). The main-loop transfer function 240 and the linear-loop transfer function 230 can have different scales. In other words, the main-loop transfer function 240 can have a first slope 245 and the linear-loop transfer function 230 can have a second slope 235. Additionally, there may be an offset 215 between the main-loop transfer function 240 and the linear-loop transfer function 230. In some implementations, the offset 215 and the scale differences are configured (e.g., set and/or adjusted) by a resistor network of the dim control 150 circuit.

The offset and scale differences of the transfer functions may create a cross-over point 201. The cross-over point 201 may illustrate the point at which the loop demanding the lowest current changes. In other words, at the cross-over point the loop that most limits the LED output changes from the main loop to the linear loop or vice versa.

The cross-over point may correspond to an LED-output threshold 225 that separates a range of possible LED outputs (i.e., divides the dimmable range) into a first portion 205 controlled by the main-loop control and a second portion 210 (i.e., deep dimming portion) controlled by the linear-loop control. Accordingly, the LED output of the dual-controlled dimming system can follow a composite transfer function 250 (i.e., gray line) that follows the main-loop transfer function 240 above the threshold 225 and that follows the linear-loop transfer function below the threshold 225. In one possible implementation the threshold 225 is approximately 8 percent (8%) of a maximum LED output 255.

The operating point (i.e., voltage/current requirement) of the LED may also be described with respect to the threshold (or condition). For example, below the threshold the LED may present a low (i.e. light) load to the SMPS and above the threshold the LED may presents a high (i.e. heavy) load to the SMPS. The SMPS may be efficient in providing power to heavy loads. Accordingly, dimming of the LED using the dual-control approach may not reduce the efficiency of the system for high loads. In other words, the dual-control approach may allow for high efficiency (>90%) operation of the SMPS in the first portion.

Figure 3:
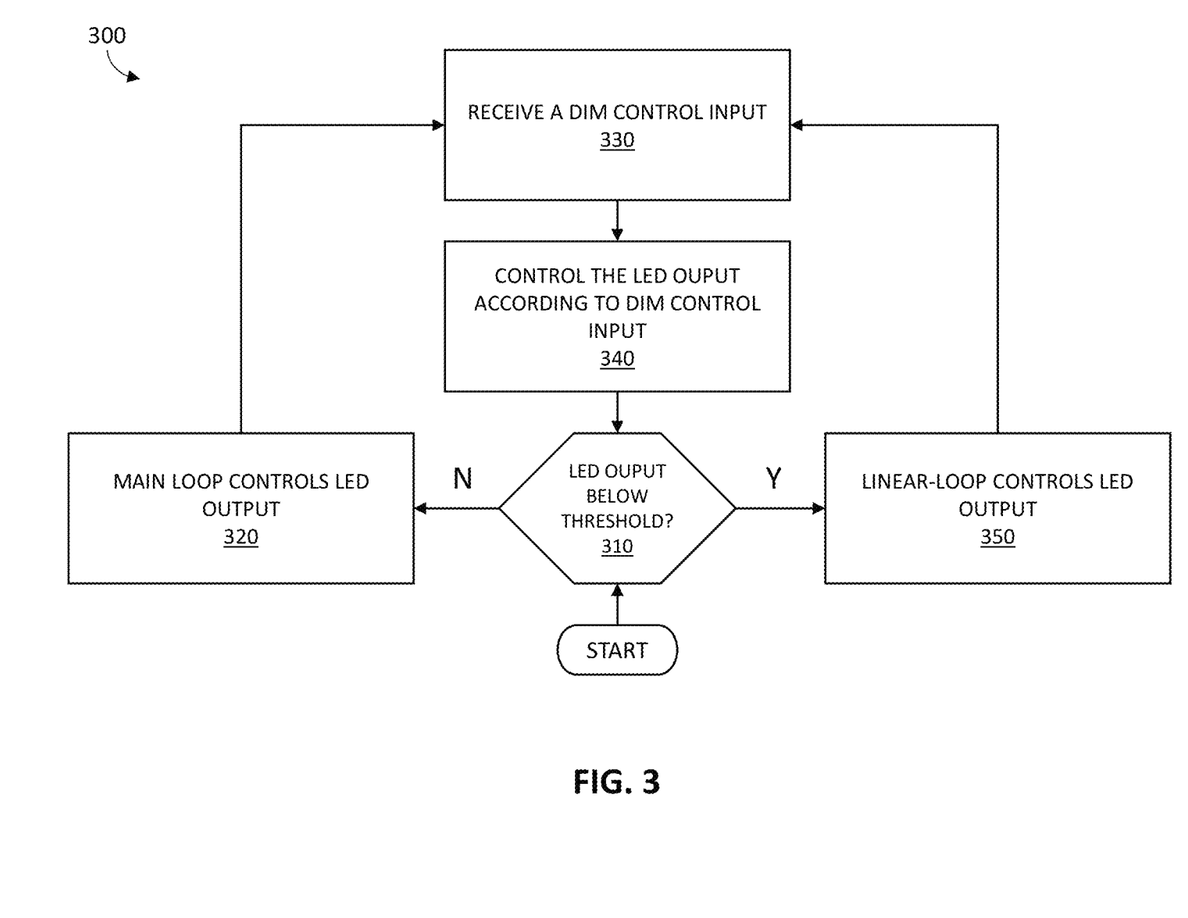
FIG. 3 depicts a flowchart of a method for controlling the output of an LED.

FIG. 3 depicts a flowchart of a method for controlling the output of an LED. In the method, the control of the LED output is determined by a condition (e.g., a threshold comparison). For the implementation shown, the condition determined 310 is an LED output below a threshold. The disclosure recognizes that other conditions may used (e.g., above a threshold, equal to a value, etc.). If the LED output is not below the threshold (i.e. above the threshold) then the main loop (i.e. the SMPS) controls the LED output 320. If the LED is above the threshold then the linear loop (i.e., the linear pass element) controls the LED output 350. In either case, a dim control input (DIM_CNTRL) is received 330 and the LED output is controlled 340 (using the main-loop control 160 or the linear-loop control 170) accordingly.

The main loop 165 and the linear loop 175 may be active at the same time but one loop may be more effective in controlling the current in the LED than the other but by virtue of their transfer functions (i.e. the cross-over point). Accordingly, the dual-control dimming system may not require activating/deactivating the main-loop control 160 or the linear-loop control 170 based on a threshold comparison.

Figure 4:
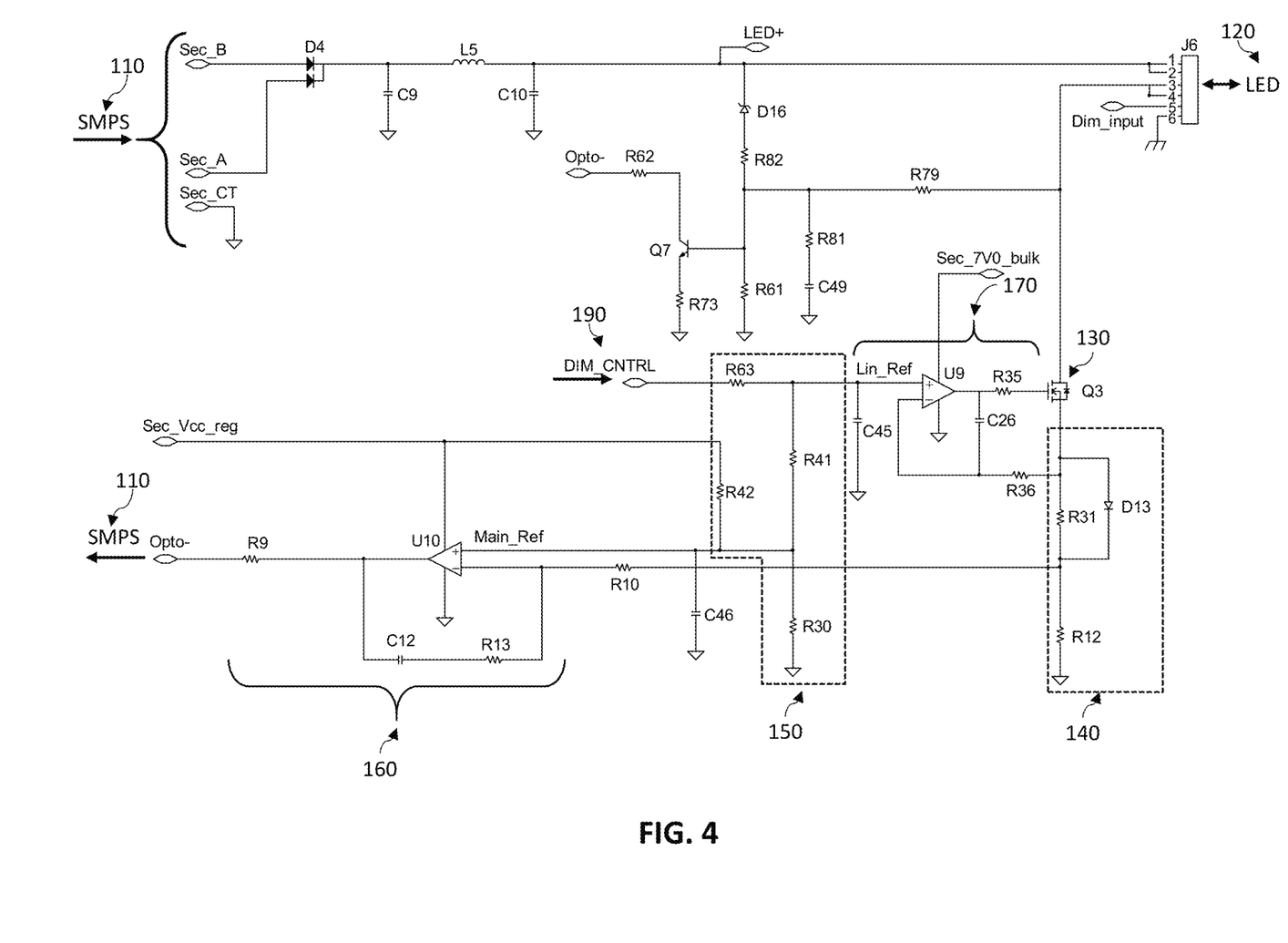
FIG. 4 depicts a schematic of a dual-control dimming circuit suitable for use in a dual-control dimming system according to a possible implementation of the present disclosure.

FIG. 4 depicts a detailed schematic of a dual-control dimming circuit suitable for use in a dual-control dimming system according to a possible implementation of the present disclosure. The dual-control circuit includes a linear pass element 130 (Q3) having a first terminal. As shown, the linear pass element 130 may be an N-channel metal oxide semiconductor field effect transistor (MOSFET). The MOSFET may have a drain terminal coupled to (and receiving current) from a terminal of an LED (not shown); a source terminal coupled to a current sensor 140; and a gate terminal coupled to an output of the linear-loop control 170. The linear pass element 130 can be configured by the output of the linear-loop control 170 to have a low (e.g., approximately zero) drain-source impedance in a fully ON condition or to have a higher impedance in a partially ON or OFF condition. When the linear pass element is configured to have the higher impedance the current in the LED can be lowered to dim the LED.

The dual-control dimming circuit further includes a current sensor 140. The current sensor may include one or more resistors (R12, R31) coupled in series between a ground and a terminal (e.g., source terminal) of the linear pass element. The one or more resistors can be used to convert the diode current to one or more voltages. The one or more voltages may be passed to an input of the linear-loop control 170 and to an input of the main-loop control 160.

The dual-control dimming circuit further includes a dim control 150. The dim control 150 may include a resistor network (R30, R41, R42, R63) configured to set a reference level (Lin_Ref) for the linear-loop control 170 and to set a reference level (Main_Ref) to the main-loop control 160. The resistor network is configured to receive a signal (e.g., a voltage from a user interface) to control the dimming of the LED (i.e. DIM_CNTRL). The resistor network is configured to provide the scaling and offset differences between the transfer curves as shown previously (see FIG. 2). In other words, the main-loop control and the linear-loop control may be coupled to different nodes in the resistor network to provide a scaling difference and an offset difference between the transfer functions of each. In some implementations, the resistor network may receive a supply voltage (Sec_Vcc_reg) to help set the offset of the transfer function for the main-loop control 160.

The dual-control dimming circuit further includes a main-loop control 160. The main loop control includes an amplifier (U10). For example, the amplifier can be an operational amplifier (i.e., opamp) having an inverting terminal and a non-inverting terminal, where the inverting terminal is coupled (via R13, C12) to an output for negative feedback. The amplifier (U10) is configured to receive (at the non-inverting terminal) a reference voltage (Main_Ref) from a node in the resistor network and to receive (at the inverting terminal) a sensed current voltage from the current sensor 140. The amplifier (U10) is configured to generate the SMPS control signal (Opto-) that can be used to control an output of the SMPS 110.

The dual-control dimming circuit further includes a linear-loop control 170. The linear-loop control includes an amplifier (U9). For example, the amplifier can be an opamp having an inverting terminal and a non-inverting terminal, where the inverting terminal is coupled to an output for negative feedback. The amplifier (U9) is configured to receive (at the non-inverting terminal) a reference voltage (Lin_Ref) from a node in the resistor network and to receive (at the inverting terminal) a sensed current voltage from the current sensor 140. The amplifier (U9) is configured to generate the LPE control signal that can be used to control an operating point of the linear pass element 130.

In embodiments of the present disclosure, both controls loops may use the current sensors for control. In some embodiments, the current sensors may use different scale factors. At low currents, the linear control may use a higher gain to resolve low currents. In some situations, this might mean that the linear current sensor may become saturated at a high output current; however, in some situations, as long as the sensor is not saturated within the operating range of the linear pass operating range, there may be no problem if it saturates outside that range.

TABLE 1 provides examples of system behaviors within certain operating regions for a particular dual-control dimming system. These operating regions are meant to provide illustration of a few possible behaviors when using dual-control dimming; however, one of skill in the art will understand the system may be accomplished with other operating behaviors capable of performing similar functions.

TABLE 1

Example operating regions for a dual-control dimming system

| BELOW THRESHOLD | ABOVE THRESHOLD |
|---|---|
| MAIN-LOOP CONTROLS LED OUTPUT<br>LPE = ON | SMPS PROVIDES FIXED VOLTAGE (across LPE)<br>LINEAR-LOOP CONTROLS LED OUTPUT |

Embodiments of the present disclosure may define the transfer functions (i.e., dim curves) so that the handoff occurs at a threshold 225 set before the SMPS output requires skip mode. Referring again to the embodiment of FIG. 2, the main-loop transfer function 240 has an offset 215 so that two curves 230, 240 cross each other at a cross-over point. In some embodiments, the offset 215 may adjusted to be about half of this threshold 225. The threshold may be defined in terms of LED output or in a current (i.e., $I_{TRANSITION}$) to provide the LED output at the threshold 225

Setting $I_{TRANSITION}$ to prevent skip mode operation prevents or reduces variation (i.e. ripple) in the LED output. The linear pass element may maintain constant current when the main converter goes into skip mode. This may occur due to output voltage variations from the skip mode showing up as voltage variations on the linear pass element which maintains a fixed output current.

Figure 5:
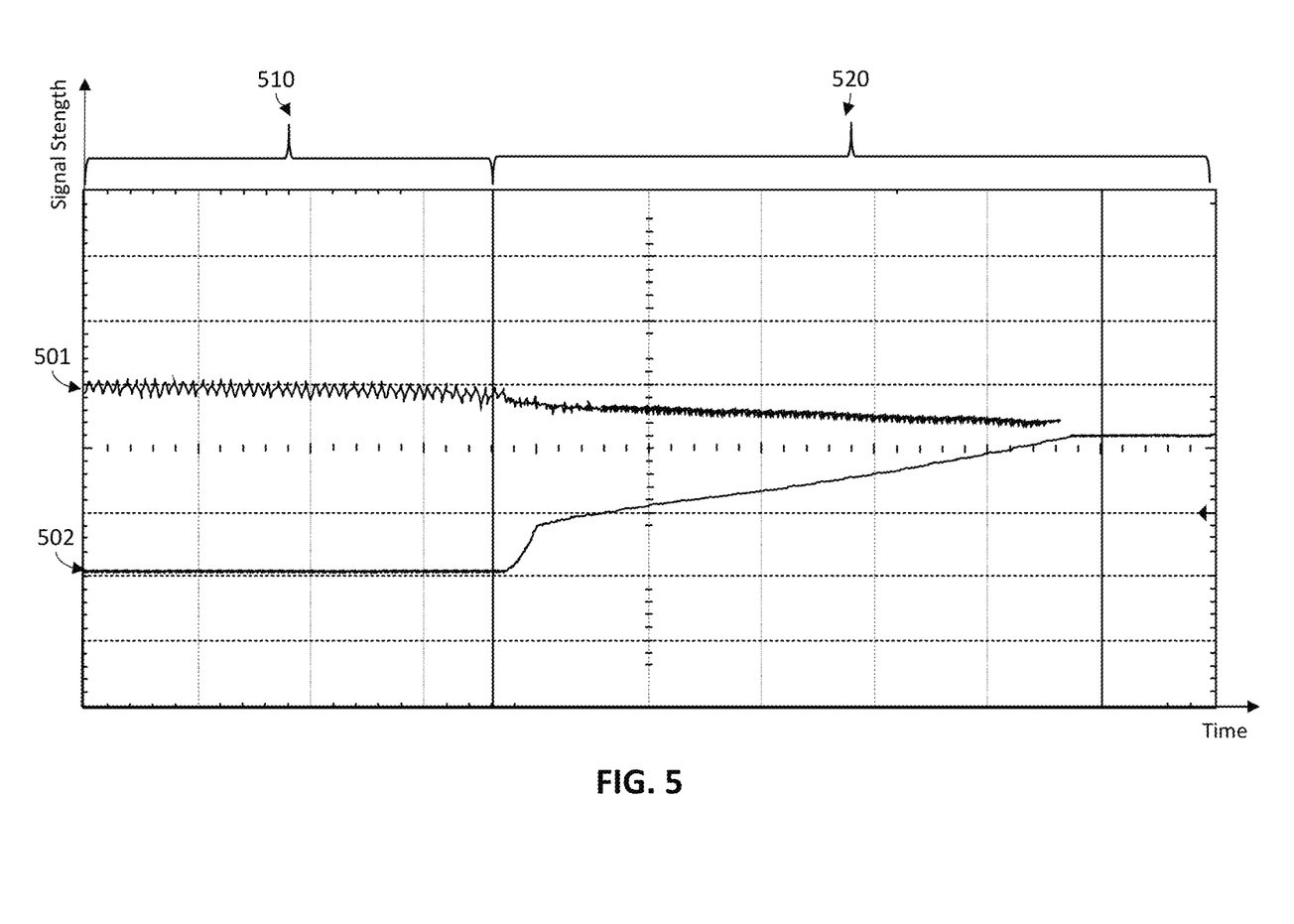
FIG. 5 depicts a graph of example signals from dual-control dimming system in operation according to an implementation of the present disclosure.

FIG. 5 depicts example signals from dual-control dimming system in operation according to an implementation of the present disclosure. The graph shows the state of an LED current 501 and a voltage ($V_{DS}$) 502 across the linear pass element as it transitions between control loops (i.e., between operating modes). In a first period 510 (e.g., 375 ms), the LED current 501 is under control of the main loop 165. In the first period 510, the voltage ($V_{DS}$) 502 is low (e.g., approximately zero), indicating that the LED current is simply passed by the linear pass element rather than being controlled. In the first period 510, ripple may be seen on the LED current 501. In a second period 520, the linear pass element takes control of the LED current 501, the ripple is eliminated for at least the reason that the linear control may have high bandwidth (BW). In the second period 520, the voltage ($V_{DS}$) across the linear pass element rises and regulates at an appropriate level.

Embodiments of the present disclosure use dual-control dimming in lighting applications. Embodiments may be used in applications such as, but not limited to, medium power AC/DC controllers for the industrial/commercial lighting market. Embodiments may allow designs to achieve deep dimming analog control for LED drivers while achieving greater efficiency (some embodiments may be able to achieve efficiency greater than 90%). The deep dimming control method may be used with a variety of converter topologies. Some applications may be able to extend the dimming range of LED drivers to less than 1% flicker free. Embodiments may be able to operate without compromising full load efficiency. Embodiments of the present disclosure may not depend on the type of pass element—any of the common type of pass elements can be used. Implementations of the present disclosure may allow for tradeoffs depending on the particular application.

Industrial LED drivers may use a dimming interface (one example being a 0-10V interface). An example dimming range for these interfaces may be 10%-100%. Some interfaces may be able to reach lower limits, such as 1% or less. LED drivers may use similar SMPS topologies as other applications (e.g., AC/DC power supplies for IT and consumer products). Standby power requirements and goals encourage techniques to allow switching power stages to operate down to or near to light load or no-load. To increase efficiency at light load or no-load some power supplies may use some concept of burst-mode or skip-mode operation. In lighting applications, skip mode or burst mode operation may result in visual artifacts in the light output that may be objectionable to the users. This may limit the usable dimming range of some LED drivers.

Variations of 1% of light output may be easily seen in some applications of skip mode LED drivers, particularly at the lowest dim levels. Applications that use linear regulators may be able to control LED current tightly with low variation. There are 2 main reasons for this: (i) they may have high DC gain, and (ii) they may have high bandwidth in the frequencies of interest because they do not have complex poles in their feedback path such as those that may exist in the output of SMPSs. Linear regulators do not store and release energy as converters do; therefore, losses may be dependent on how well matched the load is to the source. The pass element in the linear regulator may maintain some minimum voltage to stay in regulation. When the pass element voltage drop goes to zero or near-zero, drop out occurs where the regulator may no longer be able to control its output and may pass the input voltage and current to the output load. Embodiments of the present disclosure use dual-control dimming to use the SMPS operation at high loads and use the linear regulator operation at lower loads.

The present technology has been described above with reference to several exemplary embodiments. However, changes and modifications may be made to the exemplary embodiments without departing from the scope of the present technology. For example, while an exemplary embodiment may describe various topologies or operating regions, one of skill in the art will understand the system may be accomplished with other methods capable of performing similar functions. In addition, exemplary specifications such as the dimming percentages or timing specifications may have been described, but one of skill in the art will understand the present technology is not limited to such specifications. These and other changes or modifications are intended to be included within the scope of the present technology.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It will be understood that, in the foregoing description, when an element, such as a component is referred to as connected to, electrically connected to, coupled to, or electrically coupled to another element, it may be connected or coupled to the other element, or one or more intervening elements may be present. In contrast, when an element is referred to as being directly connected to or directly coupled to another element, there are no intervening elements. Although the terms directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

The invention claimed is:
1. A dual-control dimming circuit comprising:
a current sensor configured to sense an LED current conducted by an LED, the LED current corresponding to an LED output;
a main loop configured to control the LED current conducted by the LED according to a main-loop transfer function by adjusting an output of a switched mode power supply (SMPS) when the LED output is above a threshold; and a linear loop configured to control the LED current conducted by the LED according to a linear-loop transfer function by adjusting an operating point of a linear pass element (LPE) when the LED output is below the threshold.

2. The dual-control dimming circuit according to claim 1, wherein:

adjusting the operating point of the LPE dims the LED output while reducing or eliminating a flicker in the LED output.

3. The dual-control dimming circuit according to claim 1, wherein:

the LPE is a transistor, and the transistor is in a fully ON condition when the LED output is above the threshold.

4. The dual-control dimming circuit according to claim 1, wherein:

the main-loop transfer function and the linear-loop transfer function define a cross-over point at the threshold.

5. The dual-control dimming circuit according to claim 4, wherein:

the main loop and the linear loop are both active above and below the threshold, and the control of the LED by the main loop or the linear loop is determined by which loop limits the LED current to a lower level, which changes at the cross-over point.

6. The dual-control dimming circuit according to claim 4, wherein the cross-over point corresponds to an offset and a scaling difference between the main-loop transfer function and the linear-loop transfer function, the offset and the scaling difference generated by a dim control circuit.

7. The dual-control dimming circuit according to claim 6, wherein the dim control circuit is configured to generate a main reference signal for the main loop based on a dim control input and a linear reference signal for the linear loop based on the dim control input, the main reference signal offset from the linear reference signal.

8. The dual-control dimming circuit according to claim 1, further including:

a dim control circuit configured to generate a main reference signal for the main loop and a linear reference signal for the linear loop based on a dim control input.

9. The dual-control dimming circuit according to claim 8, wherein:

the main loop includes a main-loop control circuit configured to generate a SMPS control signal based on a first difference between the main reference signal and the sensed LED current, the SMPS control signal controlling current provided by the SMPS; and the linear loop includes a linear-loop control circuit configured to generate an LPE control signal based on a second difference between the linear reference signal and the sensed LED current, the LPE control signal controlling current passed by the LPE.

10. The dual-control dimming circuit according to claim 8, wherein:

the dim control input configures the dual-control dimming circuit to control the LED output to a level in a range of 1% to 100%, the LED output having no flicker in the range.

11. The dual-control dimming circuit according to claim 1, wherein the threshold corresponds to an LED output of approximately 8 percent.

12. The dual-control dimming circuit according to claim 1, wherein the SMPS includes a burst mode of operation corresponding to the threshold.

13. A method for controlling an LED output, the method including:

receiving a dim control input at a dual-control dimming system configured to control the LED output using a main loop having a main-loop transfer function or a linear loop having a linear-loop transfer function;

using the main loop to control the LED output according to the dim control input and the main-loop transfer function when the LED output satisfies a condition; and using the linear loop to control the LED output according to the dim control input and the linear-loop transfer function when the LED output in response to the condition being unsatisfied.

14. The method for controlling an LED output according to claim 13, wherein the using the linear loop to control the LED output includes:

preventing a switched-mode power supply of the main loop from creating a flicker in the LED output.

15. The method for controlling an LED output according to claim 14, wherein the preventing the switched-mode power supply of the main loop from creating a flicker in the LED output includes:

controlling the LED output using the linear loop whenever the switched-mode power supply would otherwise enter into a skip mode operation.

16. The method for controlling an LED output according to claim 13, wherein the main-loop transfer function is offset and scaled differently than the linear-loop transfer function.

17. The method for controlling an LED output according to claim 16, wherein the condition corresponds to a cross-over point between the main-loop transfer function and the linear-loop transfer function.

18. A dual-control dimming circuit including:

a current sensor configured to generate a sensed current signal corresponding to an LED current;

a main-loop control circuit configured to generate a first control signal for a switched-mode power supply based on a first comparison between the sensed current signal and a main reference signal;

a linear-loop control circuit configured to generate a second control signal for a linear pass element based on a second comparison between the sensed current signal and a linear reference signal; and a dim control circuit configured to generate the main reference signal and the linear reference signal based on a dim control signal received at the dim control circuit, the dim control circuit including a resistor network configured to provide an offset between the main reference signal and the linear reference signal.

19. The dual-control dimming circuit according to claim 18, wherein:

the main-loop control circuit includes a first opamp with an inverting terminal coupled to the sensed current signal and a non-inverting terminal coupled to the main reference signal; and the linear-loop control circuit includes a second opamp with an inverting terminal coupled to the sensed current signal and a non-inverting terminal coupled to the linear reference signal.

* * * * *